(12) United States Patent
Burch et al.

(10) Patent No.: US 6,669,237 B1
(45) Date of Patent: Dec. 30, 2003

(54) AIR BRAKE HOSE COUPLING MEMBER

(75) Inventors: John Burch, Natural Bridge, NY (US); Dan Rowland, Adams, NY (US); Mark Tinklepaugh, Central Square, NY (US); Dino Capuano, Massillon, OH (US); Ted C. Johnson, Jr., Solon, OH (US); Phil O'Reilly, Canton, OH (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/202,862

(22) Filed: Jul. 26, 2002

(51) Int. Cl.$^7$ ................................................ F16L 35/00
(52) U.S. Cl. ............................ 285/69; 285/3; 285/68; 285/87
(58) Field of Search ............................ 285/87, 68, 69, 285/88, 65, 3, 4, 72, 76, 77, 73

(56) References Cited

U.S. PATENT DOCUMENTS

| | | | |
|---|---|---|---|
| 481,250 A | | 8/1892 | Barnes |
| 496,468 A | * | 5/1893 | Winkenwerder ............. 285/68 |
| 509,114 A | | 11/1893 | Beery |
| 558,174 A | | 4/1896 | Herder |
| RE12,902 E | | 12/1908 | Kilpatrick |
| 924,166 A | * | 6/1909 | MacEwan ..................... 285/76 |
| 938,183 A | | 10/1909 | Towne |
| 963,137 A | | 7/1910 | Gold |
| 972,829 A | | 10/1910 | Creveling |
| 1,003,598 A | | 9/1911 | Graves |
| 1,021,982 A | | 4/1912 | Gold |
| 1,159,927 A | | 11/1915 | Gold et al. |
| 1,245,332 A | | 11/1917 | Gold |
| 1,249,074 A | | 12/1917 | Haldeman |
| 1,395,273 A | | 11/1921 | Gold |
| 3,010,167 A | | 11/1961 | Kozinski |
| 3,879,066 A | | 4/1975 | Kozinski |
| 3,892,431 A | | 7/1975 | Booth |
| 4,125,279 A | * | 11/1978 | Scott ............................ 285/69 |
| 4,129,323 A | * | 12/1978 | Wilson ........................ 285/69 |
| 4,402,534 A | | 9/1983 | Keenan |
| 5,388,864 A | | 2/1995 | Kozinski |
| 5,685,573 A | | 11/1997 | Nadherny et al. |
| 5,842,724 A | | 12/1998 | Kozinski |
| 5,971,442 A | | 10/1999 | Kozinski |

FOREIGN PATENT DOCUMENTS

| | | |
|---|---|---|
| CA | 579335 | 7/1959 |
| DE | 20192 | 5/1915 |
| DE | 388777 | 1/1924 |

* cited by examiner

*Primary Examiner*—David Bochna
(74) *Attorney, Agent, or Firm*—Barnes & Thornburg (57) ABSTRACT

An improved air brake hose coupling member for a rail car including a pivotally mounted pawl. The pawl has a ramp for engaging another coupling member. The engagement causes the pawl to be raised to an unlocking position automatically during coupling of the members. The axis of rotation of the pawl is in a plane substantially parallel to an inner coupling face of the member and substantially parallel to the longitudinal axis of a tubular body of the member. The coupling member also has a biasing element that causes the pawl to drop down into a locking position after coupling of the members is complete, thereby enabling the pawl to prevent undesired rotational decoupling of the members. A method for modifying existing non-locking coupling members with a pivotally mounted pawl.

15 Claims, 7 Drawing Sheets

AIR BRAKE HOSE COUPLING MEMBER

BACKGROUND OF THE INVENTION

The present invention relates generally to an air brake hose coupling member for a rail car. More particularly, the invention relates to an improved air brake hose coupling member having a pawl for engaging another coupling member automatically and for preventing undesired rotational decoupling of the members when the pawl is in a closed position.

Railroad cars use rigid and flexible air hoses, which extend along and between railroad cars, for operation of the pneumatic brake system. Coupling members are attached to each end of the flexible hoses between the cars for detachably connecting the hoses together when individual railroad cars are joined to form a train. These couplings are designed and manufactured to meet the requirements of the Association of American Railroads and are, generally, similar so as to be compatible and interchangeable with those of other manufacturers.

Normally, each coupling member is suspended from the end of a car and hangs a short distance above the railroad tracks. As is well known in the art, the couplings are joined together by pulling the air hoses from adjacent cars toward each other and pushing the seating gasket on each coupling member into an aligned and abutting relationship. The coupling members are then rotated to interengage the mating flanges and lugs that extend from the coupling members.

Often, these coupling operations are done at night and/or in adverse weather conditions. If properly performed, the coupling operation results in a sealed, fluid passage between air hoses on adjacent rail cars, whereby the air pressure in the pneumatic hose line maintains the brakes of all the individual cars in a "released" position. Any undesired decoupling of the members will result in a loss of air pressure, which will cause the brakes in all of the cars to go to an "applied" or braking position, resulting in the sudden stopping of the train with the subsequent delay, inconvenience and expense, as well as the chance of accidents.

However, occasionally, coupled members can become uncoupled prematurely. This occurs, for instance, when they are struck or pushed up by a raised object, or the like, lying between the railroad tracks. That action can cause the members to rotate in an uncoupling direction, resulting in the undesirable emergency stopping of the train. It is, thus, desirous to avoid undesired rotational decoupling of the members.

Several types of locking devices have been devised for known coupling members to prevent undesired uncoupling, such as shown in U.S. Pat. Nos.: 3,892,431; 3,879,066; 5,388,864; and 5,971,442. Although these types of locking devices do reduce the accidental rotational uncoupling of the coupling members, all of them require the manual manipulation of the coupling member and manual operation of some part of the locking mechanism in order to have one coupling member engage, rotate, couple and rotationally lock with another member. That, in turn, requires a certain dexterity and effort in normal and adverse conditions to both engage and rotationally lock coupling members.

Therefore, a need exists for an improved air brake hose coupling member that does not require manual manipulation of the coupling member locking mechanism to prevent undesired rotational decoupling of two members.

The present invention has a locking mechanism that is automatically engaged when two coupling members are brought into abutting relationship and rotated in a coupling direction.

SUMMARY OF THE INVENTION

The present invention relates to an improved air brake hose coupling member for a rail car. The coupling member has a generally tubular body with a longitudinal axis and an inner coupling face at a first end of the body. The coupling face is aligned generally in a plane parallel to the longitudinal axis and extends around an air passage. The coupling member also includes a shank at a second end of the body that is adapted to be connected to an air brake hose. The coupling member also has an arcuate locking lug projecting outwardly from the first end of the body and has an L-shaped annular flange. The coupling member further includes a pawl that is pivotally mounted on the coupling member. The pawl has a ramp for engaging another coupling member and for causing the pawl to be raised to an opened or unlocking position automatically during coupling of the members. The axis of rotation of the pawl is in a plane substantially parallel to the inner coupling face and substantially parallel to the longitudinal axis of the tubular body. The coupling member also has a biasing element that causes the pawl to drop down into a closed or locking position after the coupling of the members is complete.

The locking lug and L-shaped annular flange are adapted to engage with the L-shaped annular flange and locking lug, respectively, of another coupling member. That couples the members together when the inner coupling faces of the two coupling members are placed in an abutting relationship substantially along their entire inner coupling faces and are rotated with respect to each other. When the members are fully coupled and the pawl automatically is in a closed position. The pawl prevents undesired rotational decoupling of the members when coupled members are rotated oppositely with respect to one another in a decoupling direction.

A ramp or initial cam surface on the pawl may extend at an acute angle (for instance, approximately in the range of 35–55 degrees) downward from a plane of a top surface of the arcuate locking lug to initially engage another coupling member. The pawl may further include a riding surface, adjacent and generally at an acute or close to right angle, for instance, in the range of approximately 70–90° to the initial cam surface, that extends in a plane that is substantially parallel to the plane of the top surface of the pawl. The pawl may further include a transition surface adjacent to both the initial cam surface and the riding surface to assist the pawl in moving from its initial contact position on the ramp to an engaging or riding position on the L-shaped flange of another coupling member.

The pawl may also include one or more locking surfaces to trap or stop the L-shaped flange of another coupling member. The at least one locking surface extends downward in a plane substantially perpendicular to the plane of the top surface of the pawl. The pawl may further include extension surfaces to cause the pawl, when mounted on the coupling member, to be so positioned such that the locking surface or surfaces are able to trap or stop another coupling member from uncoupling.

The pawl may be designed to fracture at a predetermined location such that the remaining portion of the pawl mounted on the coupling member may be without any locking surfaces but still leave the member able to function as a coupling member by allowing desired or intentional rotational decoupling. That functioning coupling member may have no sharp parts hanging on or from the pawl, thereby preventing injury while allowing desired rotational decoupling. The pawl may be weighted so as to fall into the locking position, even if the biasing element fails. The pawl may also be adapted to be raised to an opened or unlocking position manually and to be lowered to a closed or locking position manually.

The pawl may further include an opening adapted to receive a pin to mount the pawl on the coupling member, and that opening is in a ball-shaped end. When the pawl is raised or lowered, it pivots about an axis defined by the pin mounted in a hole on the coupling member. The coupling member may also include a pin for pivotally mounting the pawl to the coupling member. The coupling member may further include one or more holes that are adapted to receive the pin and an end of the pawl.

The biasing element may be a torsion spring, which may be detachably connected to the pawl, pin and coupling member.

Existing non-locking coupling members may also be modified or retrofitted with the locking element, or pawl, of the present invention. The method of doing this is by drilling one or more holes in the non-locking coupling member, and then mounting the pawl in one of the holes such that the pawl will rotate in a plane substantially parallel to the inner coupling face and substantially parallel to the longitudinal axis of the body.

Other aspects of the present invention will become apparent from the following detailed description of the invention, when considered in conjunction with accompanying drawings.

DETAILED DESCRIPTION OF THE PREFERRED EMBODIMENTS

Coupling members are well known in the art, and the coupling member described next in this paragraph is standard in the industry and shown, for example, in U.S. Pat. No. 5,971,442, and which is available from New York Air Brake. Such a coupling member 20 includes a generally tubular body 22 with a longitudinal axis 24. The coupling member 20 has an inner coupling face 26 at a first end 68 of the body 22 that is aligned generally in a plane parallel to the longitudinal axis 24. The inner coupling face 26 extends around an air passage 28. The coupling member 20 also includes a shank 30 at a second end 72 of the body 22 that is adapted to be connected to an air hose (not shown). Each coupling member 20 further includes an arcuate locking lug 32 and an L-shaped annular flange 34, which are adapted to engage with a locking lug 32 and flange 34, respectively, of another coupling member 20 to couple two coupling members 20 together. The coupling of the members 20 can occur when the inner coupling faces 26 of the two members 20 are placed in an abutting relationship substantially along their entire coupling faces 26 and rotated with respect to one another. (See FIGS. 1–7)

Figure 3:
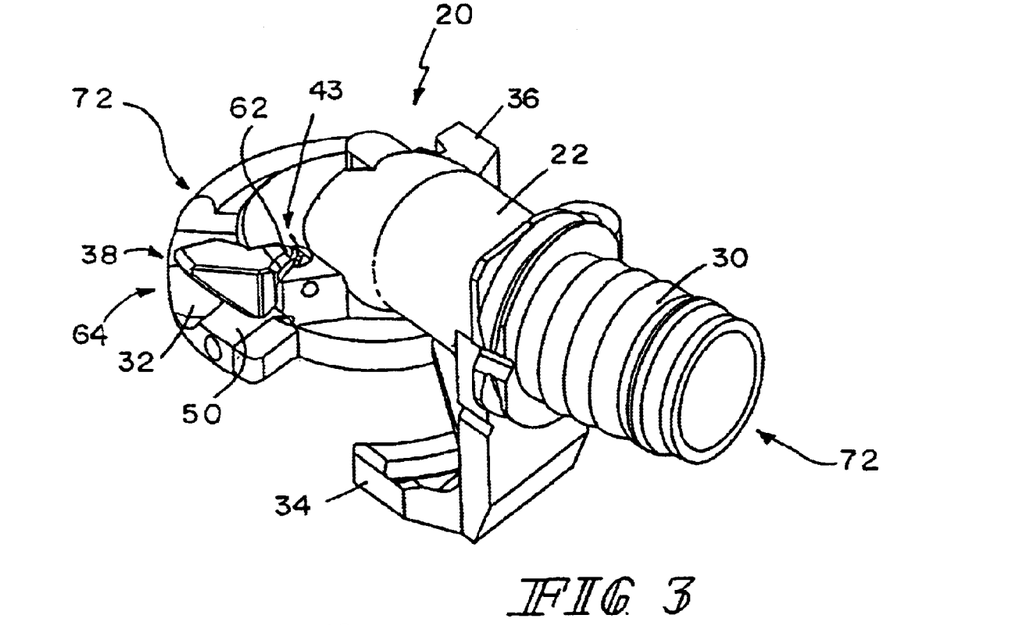
FIG. 3: Top perspective view of a coupling member with a pawl in a closed position, according to the principles of the invention.
Figure 4:
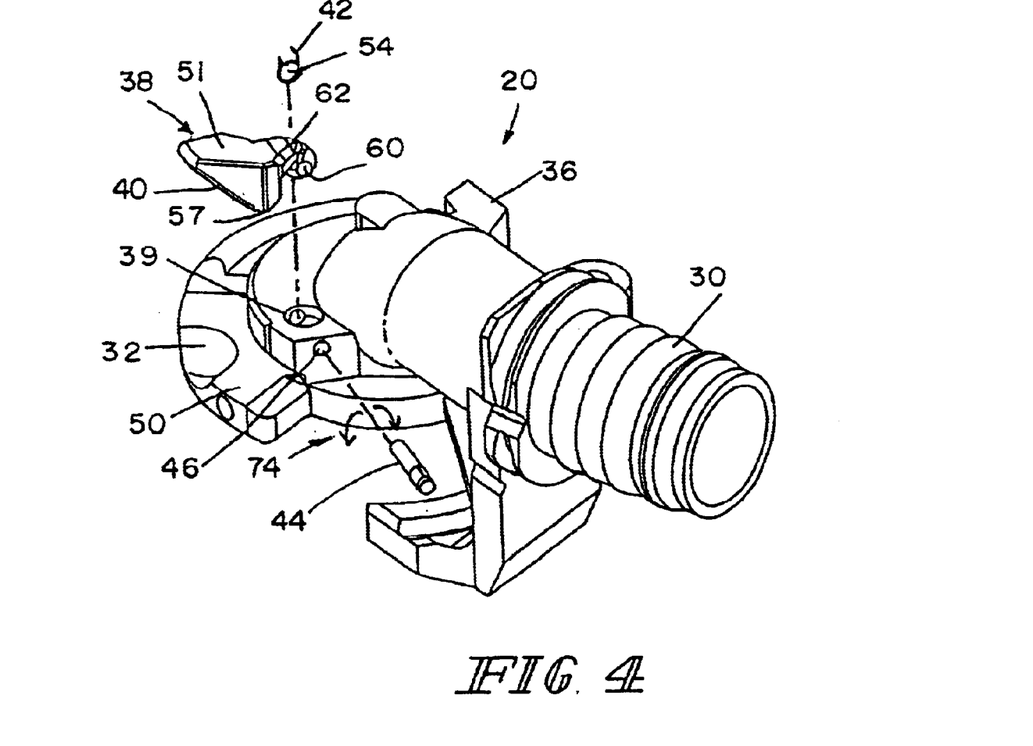
FIG. 4: Partial exploded view of a coupling member, according to the principles of the invention.
Figure 5:
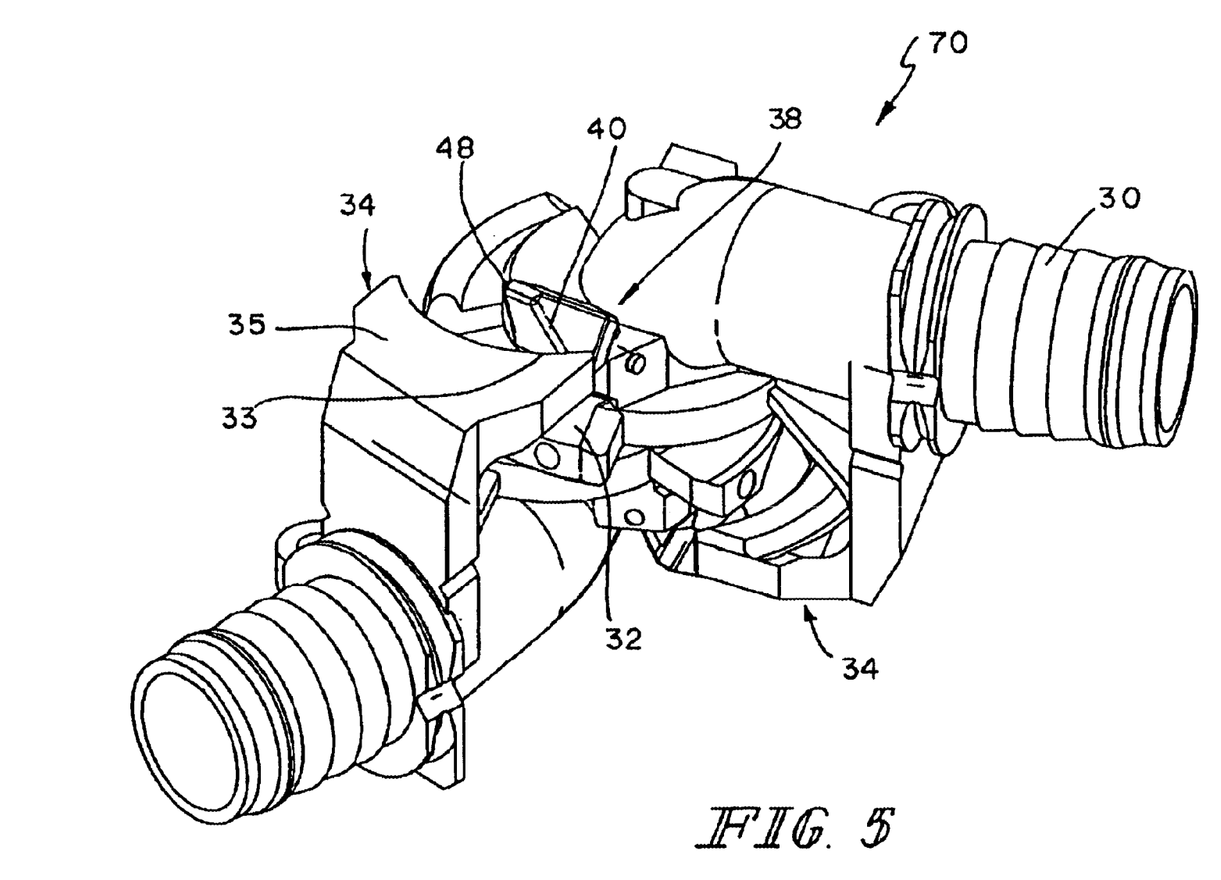
FIG. 5: Top perspective view of two coupling members initially engaging, according to the principles of the invention.
Figure 6:
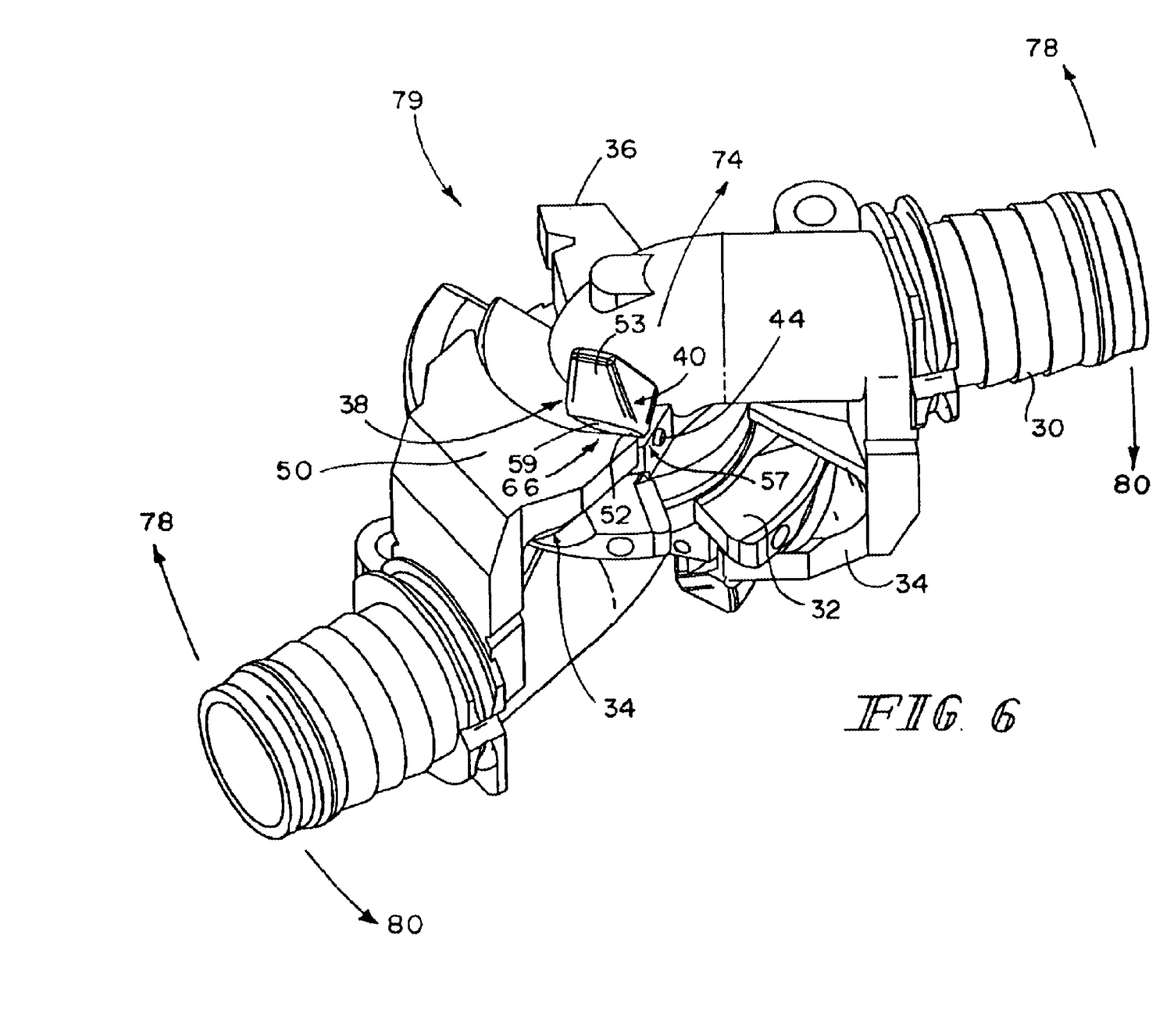
FIG. 6: Perspective view of two coupling members with a pawl in an opened or unlocking position, according to the principles of the invention.
Figure 7:
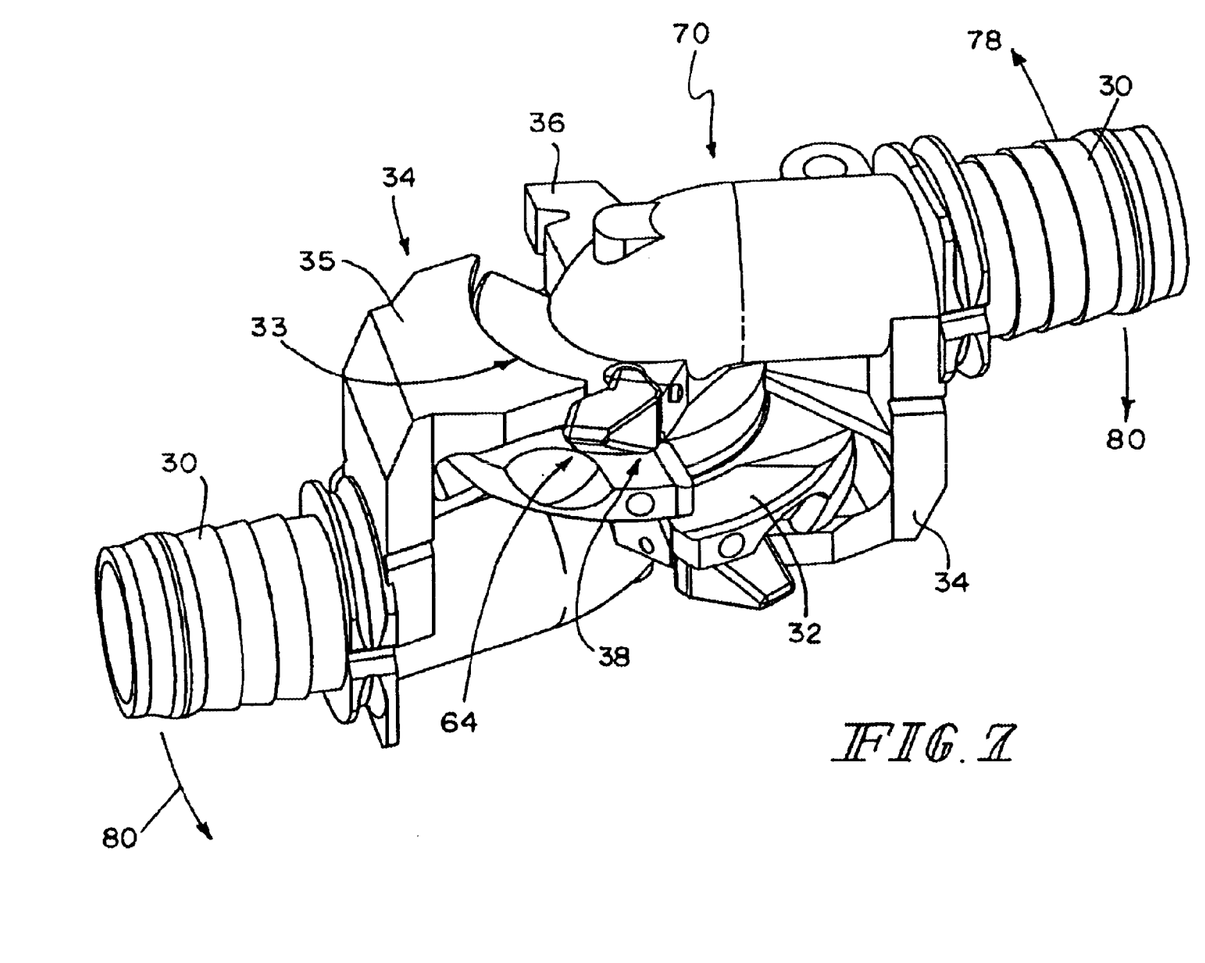
FIG. 7: Perspective view of two coupling members with a pawl in a closed or locking position, according to the principles of the invention.
Figure 8:
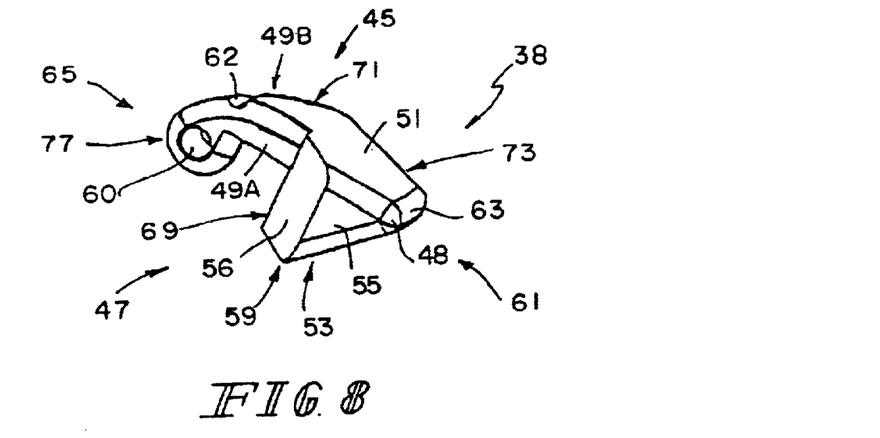
FIG. 8: Left side perspective view of a pawl, according to the principles of the invention.
Figure 9:
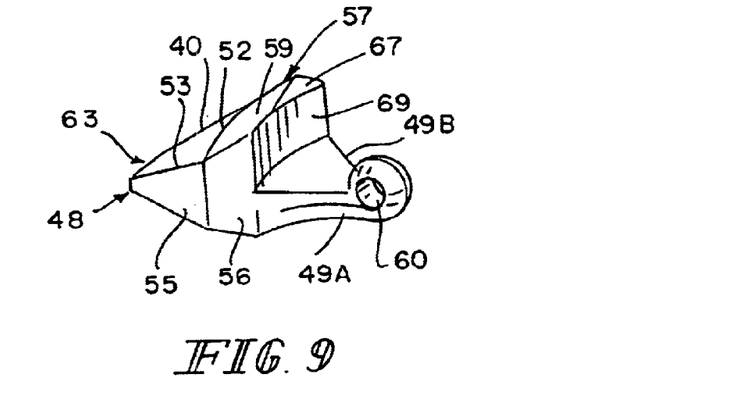
FIG. 9: Bottom view of a pawl, according to the principles of the invention.
Figure 10:
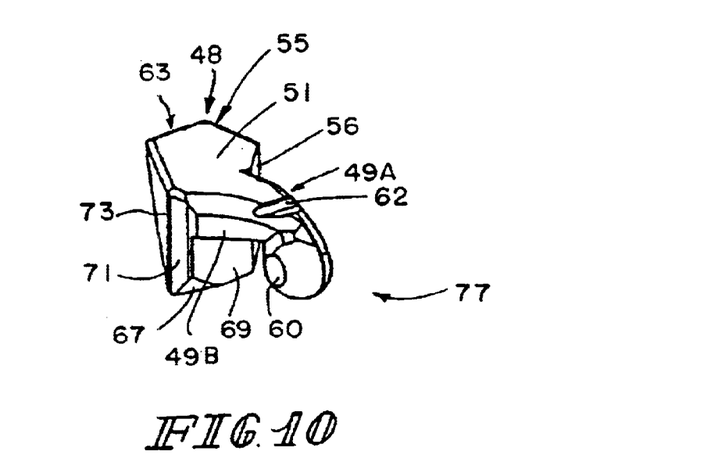
FIG. 10: Back side perspective view of a pawl, according to the principles of the invention.
Figure 11:
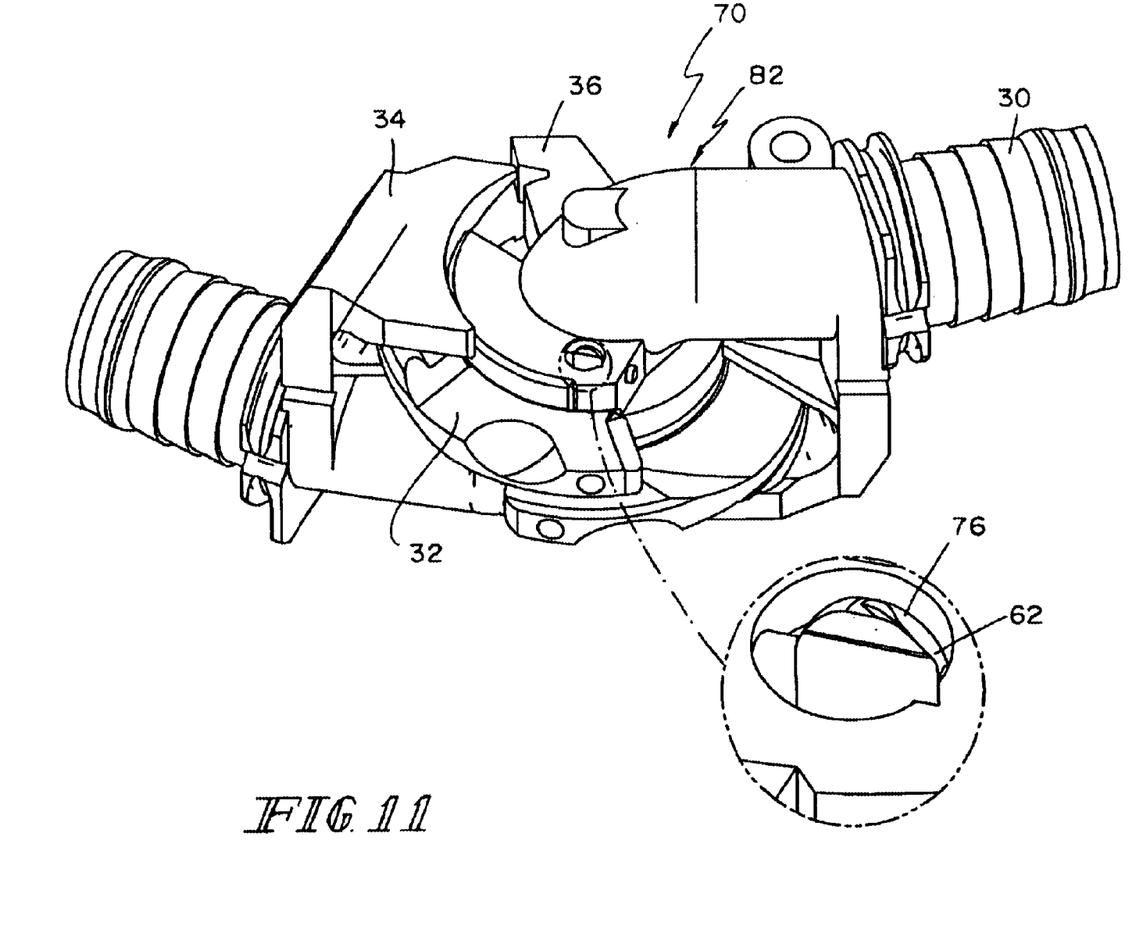
FIG. 11: Perspective and exploded view of two coupling members with both members having a fractured pawl (only one is shown), according to the principles of the invention.

An improved air brake hose coupling member 20 of the present invention is shown in FIGS. 1 through 4. Two coupling members 20 that are initially engaging or are coupled together are shown in FIGS. 5 through 7. An improved locking element, or pawl 38, is shown mounted on the coupling member 20 in FIGS. 1, 3 and 5 through 7. Various views of the pawl 38 alone are shown in FIGS. 8 through 10. A view of a fractured pawl 38 with a portion of the pawl still mounted on a coupling member 20 is shown in FIG. 11.

As shown in FIGS. 3 through 7, the pawl 38 is pivotally mounted on the coupling member 20 and rotates on an axis in a plane substantially parallel to the inner coupling face 26 and substantially parallel to the longitudinal axis of the body 22. The pawl 38 includes a ramp or initial cam surface 40 for engaging another coupling member 20 and for causing the pawl 38 to be raised to an opened or unlocking position 66 automatically during coupling of two members 20, as shown in FIGS. 5 through 7. When the coupling members 20 are coupled and the pawl 38 is in a locking position 64, the pawl 38 prevents undesired rotational decoupling of the members 20, as shown in FIG. 7.

The following description of the pawl 38 includes references to its surfaces. Those surfaces may be edges or planes or a combination of both and they may also be flat or curved.

The pawl 38 is a complex design, as shown in FIGS. 3 through 7 and, in more detail, in FIGS. 8 through 10.

The pawl 38 has a front side 61, a back side 65, a left side 47 and a right side 45.

The pawl 38 has a top surface 51 that is configured to come to an angular, but rounded, point or tip 48 and a rounded edge 63. Two extension surfaces 49A and 49B are formed in a downward direction and in a plane generally perpendicular to the top surface 51. Extension surface 49A is formed on the left side 47, and extension surface 49B is formed on the right side 45. Both extension surfaces 49A and 49B also extend toward the back side 65 terminating adjacent to an opening 60.

A locking surface 56 is formed adjacent to and generally in the same downward direction and plane as extension surface 49A and at generally an obtuse angle from the extension surface 49A. Extension surface 49A may also be adapted to be used as a locking surface. The locking surface 56 extends further downward from the top surface 51 than the extension surface 49A so that the pawl 38, when mounted on a coupling member 20, may trap or stop another coupling member 20 and prevent undesired rotational decoupling of two members 20.

Adjacent locking surface 56 and toward tip 48 is leading surface 55, formed generally as a triangle in a downward direction and generally in a plane perpendicular from top surface 51. One point of the triangle terminates at bottom surface 59.

The pawl 38 further includes an angular lifting surface 53 formed approximately as a trapezoid on the front side 61, beginning at front end surface 63 and extending in a downward direction at an acute angle from the top surface 51 and terminating at the bottom surface 59. The bottom surface 59 extends in a plane generally parallel to the top surface 51. A second, generally triangular clearance surface 67 is formed adjacent to the bottom surface 59 and extends upward at an acute angle toward the top surface 51 and toward back side 65.

The pawl 38 further includes a ramp or initial cam surface 40 that extends at an acute angle (for instance, approximately in the range of 35–55 degrees) downward from a plane of top surface 51 and terminating at riding surface 52 and transition surface 57. Transition surface 57 lies at the confluence of at least riding surface 52, ramp 40 and bottom surface 59.

Lying between lifting surface 53 and bottom surface 59 and adjacent initial cam surface 40 is riding surface or edge 52. Riding surface 52 extends generally at an acute or close to right angle (for instance, in the range of approximately 70°–90°) to initial cam surface 40 in a plane that is substantially parallel to the plane of top surface 51.

The back side 65 has a back surface 69 formed in a plane upward and generally perpendicular to the bottom surface 59 terminating at extension surface 49B and right edge surface 71.

The right side 45 includes support surface 73 formed generally as a triangle and in a downward plane generally perpendicular to the top surface 51 and lying adjacent to right edge surface 71. Right edge surface 71 is formed generally as a trapezoid and in a plane generally perpendicular to, and downward from, top surface 51.

As shown in FIGS. 4 and 8 through 10, the back side 65 of the pawl 38 includes a hole 60 for mounting the pawl to a coupling member 20. The end of the back side 65 may be ball-shaped 77.

The coupling member 20 may also include a hole 46 formed in the body 22 and adapted to receive a pin 44 for pivotally mounting the pawl 38 to the coupling member 20 through opening 60 of the pawl 38. The coupling member 20 may also include a hole 39 formed in the body 22 adapted to receive an end of the pawl 38.

The ball-shaped design 77 of the back side 65 of the pawl 38 may help resist malfunctioning by reducing the amount of contamination that can collect in and around hole 39 on the coupling member 20. The hole 39 may be lubricated, for example, with grease or a similar lubricant to maintain free movement of the pawl 38 and prevent malfunctioning.

The coupling member 20 also includes a biasing element which may be a torsion spring 42, as shown in FIG. 4, or may be a similar element that causes the pawl 38 to rotate about the axis 74 and into a locking position 64 after coupling of the members 20 is complete, as shown in FIG. 7.

The pawl 38 may be constructed as a solid or hollow "finger" or similar element, or may be entirely comprised of a spring or similar element. The spring may be of the leaf or coil variety and may be flat, curved or twisted.

The pawl 38 may be designed to fracture at a predetermined location (for example, at or along the notch or scoring 62 in the top surface 51) such that a remaining portion of the pawl 76 still mounted on the coupling member 20 after fracturing leaves a functional coupling member 82 that may be with or without a locking surface 56. The pawl 38 may also be designed to fracture at other locations to leave at least one locking surface remaining on the pawl 38. A fractured pawl without a locking surface 56 remaining is shown in FIG. 11. The pawl 38 of the functioning coupling member 82 may have no sharp parts hanging off the pawl 38 that could injure someone or prevent desired rotational decoupling of the members. The pawl 38 may be weighted so as to fall into a closed or locking position 64, even if the biasing element fails.

The complex design of the pawl 38, as described above, with its rounded, smooth surfaces, tips and edges (for example 48 and 63) and varying angles reduces the likelihood of the pawl 38 dragging or catching on objects that may be lying between railroad tracks. Such a design minimizes the possible grinding of the surfaces or edges into sharp, knife-like edges or points that can cause injury. The pawl 38 may also be cast, molded or machined from high-strength metals, alloys or plastic materials. The construction of the pawl 38 and the way it is mounted may also be designed to "give" during either normal or abnormal use and still function to prevent undesired rotational decoupling of the members 20 when the pawl 38 is in the locking position 64. Such "give" may occur when the pawl is in the locking position 64, the members are rotated in a decoupling direction and a force is exerted on the locking surface 56 and back surface 69 of the pawl 38.

A method of attachment of the pawl 38 to the coupling member 20 is shown in FIG. 4. The ball-shaped end 77 of the pawl 38 is inserted into hole 39. Spring 42 is then inserted in hole 39 between the left side 47 of the pawl (adjacent the ball-shaped end 77) and the inside edge of the opening 39 on the coupling member 20. One end of the spring 42 is detachably seated under tension in the notch or scoring 62 of the pawl 38, and the other end of the spring 42 is detachably seated under tension on the surface of the coupling member 20 at location 43, as shown in FIGS. 3 and 4. The pin 44 is inserted through hole 46 on the coupling member 20 and through opening 60 in the pawl 38 and the opening 54 in the spring 42 which surrounds the pin 44. The pin 44 is tapped, or otherwise pushed, into place with one end left generally flush with the exterior surface of the coupling member 20.

Once the pawl 38 is mounted on the coupling member 20, it may be raised or lowered and may pivot about an axis defined by the pin 44 mounted through the hole 46 on the coupling member 20.

As seen in FIGS. 3, 4 and 7 through 10, the length of extension surfaces 49A and 49B are such that the pawl 38 extends far enough away from the coupling member 20 to enable the pawl 38 to drop down into a locking position 64 and have locking surface 56 trap or stop another coupling member 20 when two coupling members 20 are coupled and rotated in a decoupling direction 80. The vertical height of the locking surface 56, that is, the vertical distance between the top surface 51 and the bottom surface 59, is such that it is able to trap a portion of the L-shaped flange 34 of another coupling member 20.

The present invention, then, essentially works as follows, as shown in FIGS. 5 through 7:

Two coupling members 20 are brought into contact with one another by having the ramp 40 of the pawl 38 of one coupling member 20 engage the edge 33 of the L-shaped flange 34, as shown in FIG. 5. This causes the pawl 38 to move toward an opened or unlocking position 66 as it travels along ramp 40. Travel continues along cam surface 40 and then through transition surface 57 to riding surface 52 and/or clearance surface 67, as shown in FIG. 6. The coupling members 20 have now been brought into an abutting relationship substantially along their inner coupling faces 26 (seen in FIG. 2). At this point, the pawl 38 has its riding surface 52 and/or its clearance surface 67 riding along the top surface 50 of the L-shaped flange 34, and the coupling members 20 are being rotated in a coupling direction 78. The members 20 continue to be rotated in a coupling direction 78, and, after a certain distance, the pawl 38 automatically drops into a locking position 64, as shown in FIG. 7.

Continued rotation in the coupling direction 78 is prevented from going too far by stop 36 on each coupling member 20. After being coupled, the coupled members 20 are free to rotate in either a coupling direction 78 or in a decoupling direction 80 over a limited arc without decoupling. The pawl 38 may be mounted anywhere on the coupling member 20 adjacent to the arcuate locking lug 32 such that the pawl's positioning enables it to prevent undesired rotational decoupling when the members 20 are rotated in a decoupling direction 80 and the pawl 38 is in a locking position 64.

When a rotational decoupling force is applied to two coupled members 20 and the members 20 are thus rotated in a decoupling direction 80, the locking surface 56 traps the L-shaped flange 34 of the opposing coupling member 20. At the same time, back surface 69 of the pawl 38 shoulders up against its own coupling member 20 and, along with locking surface 56, resists further rotation in decoupling direction 80.

Since there are a number of different manufacturers of coupling members, clearance surface 67 is designed to allow maximum clearance when the pawl 38 is raised up to slide over an L-shaped flange 34 of a mating coupling member 20.

The tip 48 of the pawl 38 is designed to have a rounded nose that will prevent injury and resist damage if the coupling member 20 happens to be dragged between railroad tracks and strikes the ground or objects that may lie between the tracks.

The pawl 38 on each member 20 may be raised manually to an unlocking position 66 when rotational decoupling of the members is desired. Rotational decoupling may be accomplished by lifting up on the lifting surface 53 on both coupling members 20, as shown in FIG. 6, until each pawl 38 clears the top surface 50 of each arcuate locking lug 34. The members 20 may now be rotated in a decoupling direction 80, as shown in FIG. 7, and then decoupled. Coupled members 20 may also be decoupled axially, generally along the longitudinal axes 24 of the coupling members 20, without any manipulation of, or interference by, the pawls 38. That can occur, for instance, when adjacent rail cars are forcibly pulled apart from each other.

The locking element, or the pawl 38, may be used to modify or retrofit existing non-locking coupling members (not shown).

Figure 1:
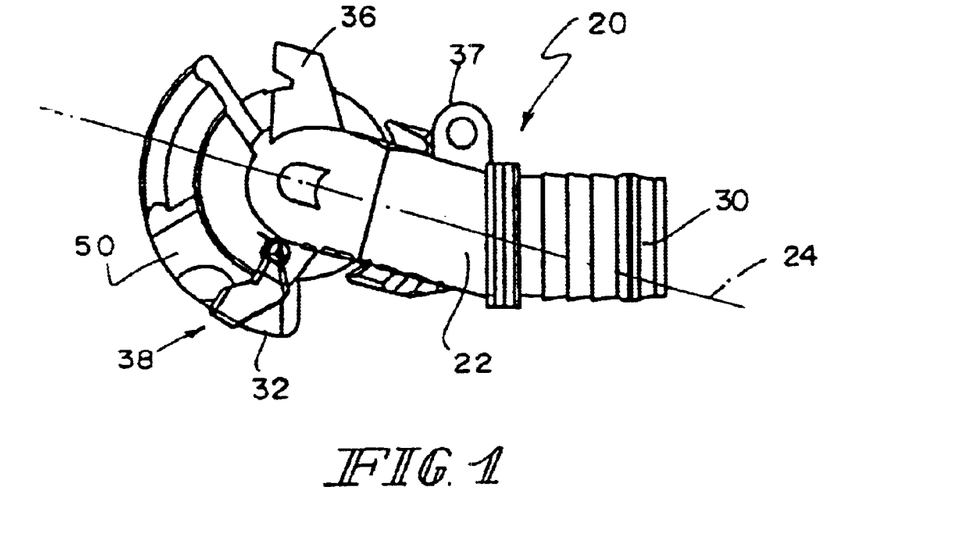
FIG. 1: Top view of a coupling member, according to the principles of the invention.
Figure 2:
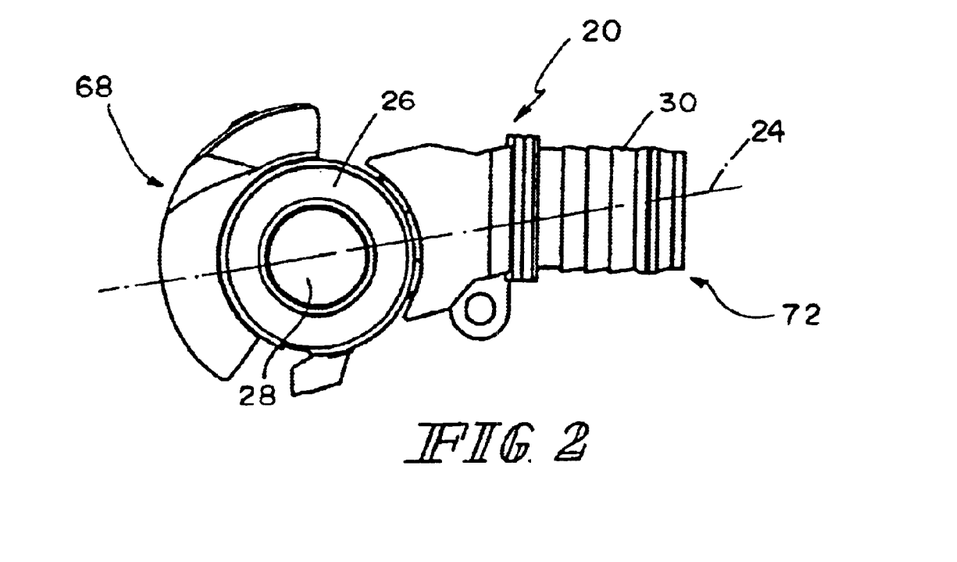
FIG. 2: Bottom view of a coupling member, according to the principles of the invention.

The method of modification may comprise the steps of drilling at least one hole, such as 46, but preferably two holes, such as 46 and 39, in the coupling member 20, as shown in FIG. 4, and then mounting the pawl 38 such that the pawl 38 rotates in a plane substantially parallel to the inner coupling face 26 (FIG. 2) and substantially parallel to the longitudinal axis 24 of the coupling body 22 (FIG. 1).

The method may also include shot- or sand-blasting and coating by applying phosphate in a heated solution or by electroplating with calcium or zinc, or equivalent metals.

The method may further include the steps of setting the pawl 38 in the hole 39, pushing the spring 42 into a gap between the pawl 38 and the inside edge of hole 39, pushing in the pin 44 through hole 46, and tapping in the pin 44 until it is generally flush with the exterior of coupling member 20, as shown in FIGS. 4 through 7. The method may also include lubricating the area in and around the hole 39 with grease, or a similar lubricant, to prevent or reduce contamination that could inhibit the operation or rotation of the pawl 38.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed is:

1. An air brake hose coupling member for a rail car, comprising:
   a generally tubular body with a longitudinal axis and an inner coupling face at a first end that is aligned generally in a plane parallel to the longitudinal axis and extending around an air passage;
   a shank at a second end of the body adapted to be connected to an air brake hose;
   an arcuate locking lug projecting outwardly from the first end of the body;
   an L-shaped annular flange on the body;
   wherein the locking lug and L-shaped annular flange are adapted to engage with the L-shaped annular flange and locking lug, respectively, of another coupling member to couple the members together when the inner coupling faces of the two coupling members are placed in an abutting relationship substantially along their entire inner coupling faces and rotated with respect to each other;
   a pawl, pivotally mounted on the coupling member and, wherein the axis of rotation of the pawl is in a plane substantially parallel to the inner coupling face and substantially parallel to the longitudinal axis of the body;
   a ramp on the pawl for engaging another coupling member and for enabling the pawl to be raised to an unlocking position automatically during coupling of the members;
   wherein, when the members are coupled and the pawl is in a closed position, the pawl prevents undesired rotational decoupling of the members; and
   a biasing element that causes the pawl to drop down into a locking position after coupling of the members is complete.

2. The coupling member of claim 1, wherein the ramp is an initial cam surface extending at an acute angle downward from the plane of a top surface of the pawl, to initially engage another coupling member.

3. The coupling member of claim 2, wherein the acute angle is approximately in the range of 35 to 55 degrees.

4. The coupling member of claim 3, wherein the pawl further includes at least one locking surface formed in a plane substantially perpendicular to the plane of the top surface of the pawl, wherein the at least one locking surface prevents undesired rotational decoupling of the members when the pawl is in a locking position.

5. The coupling member of claim 4, wherein the pawl further includes a transition surface lying between the ramp and the riding surface.

6. The coupling member of claim 5, wherein the pawl further includes a clearance surface formed adjacent to a bottom surface and to the transition surface.

7. The coupling member of claim 2, wherein the pawl further includes a riding surface extending in a plane that is substantially parallel to the plane of the top surface of the pawl.

8. The coupling member of claim 1, wherein the pawl further includes a back side having an opening therein adapted to receive a pin to pivotally mount the pawl on the coupling member.

9. The coupling member of claim 8, further including holes formed on the body adapted to receive the pin and the back side of the pawl, wherein the back side is ball-shaped.

10. The coupling member of claim 9, wherein the biasing element is a torsion spring.

11. The coupling member of claim 10, wherein the torsion spring is detachably connected to the pawl, pin and coupling member.

12. The coupling member of claim 1, wherein the pawl is designed to fracture at a pre-determined location such that the remaining portion of the pawl mounted on the coupling member allows desired rotational decoupling of the members.

13. The coupling member of claim 1, wherein the pawl is weighted so as to fall into the closed position even if the biasing element fails.

14. An air brake hose coupling member for a rail car, comprising:

a generally tubular body with a longitudinal axis and an inner coupling face at a first end that is aligned generally in a plane parallel to the longitudinal axis and extending around an air passage;

a shank at a second end of the body adapted to be connected to an air brake hose;

an arcuate locking lug projecting outwardly from the first end of the body;

an L-shaped annular flange on the body;

wherein the locking lug and L-shaped annular flange are adapted to engage with the L-shaped annular flange and locking lug, respectively, of another coupling member to couple the members together when the inner coupling faces of the two coupling members are placed in an abutting relationship substantially along their entire inner coupling faces and rotated with respect to each other;

a pawl, pivotally mounted on the coupling member and, wherein the axis of rotation of the pawl is in a plane substantially parallel to the inner coupling face and substantially parallel to the longitudinal axis of the body; and a ramp on the pawl for engaging another coupling member and for enabling the pawl to be raised to an unlocking position automatically during coupling of the members and, wherein the ramp is an initial cam surface extending at an acute angle downward from a plane of a top surface of the arcuate locking lug, to initially engage another coupling member.

15. An air brake hose coupling member for a rail car, comprising:

a generally tubular body with a longitudinal axis and an inner coupling face at a first end that is aligned generally in a plane parallel to the longitudinal axis and extending around an air passage;

a shank at a second end of the body adapted to be connected to an air brake hose;

an arcuate locking lug projecting outwardly from the first end of the body;

an L-shaped annular flange on the body;

wherein the locking lug and L-shaped annular flange are adapted to engage with the L-shaped annular flange and locking lug, respectively, of another coupling member to couple the members together when the inner coupling faces of the two coupling members are placed in an abutting relationship substantially along their entire inner coupling faces and rotated with respect to each other;

a pawl, pivotally mounted on the coupling member and, wherein the axis of rotation of the pawl is in a plane substantially parallel to the inner coupling face and substantially parallel to the longitudinal axis of the body; and wherein the pawl is designed to fracture at a predetermined location such that the remaining portion of the pawl mounted on the coupling member allows desired rotational decoupling of the members.

* * * * *